United States Patent
Orlando et al.

(10) Patent No.: US 12,463,830 B2
(45) Date of Patent: Nov. 4, 2025

(54) DEVICE IDENTIFIER COMPOSITION ENGINE 3-LAYER ARCHITECTURE

(71) Applicant: Micron Technology, Inc., Boise, ID (US)

(72) Inventors: Alessandro Orlando, Milan (IT); Niccolò Izzo, Vignate (IT); Danilo Caraccio, Milan (IT)

(73) Assignee: Micron Technology, Inc., Boise, ID (US)

(*) Notice: Subject to any disclaimer, the term of this patent is extended or adjusted under 35 U.S.C. 154(b) by 521 days.

(21) Appl. No.: 17/810,952

(22) Filed: Jul. 6, 2022

(65) Prior Publication Data

US 2023/0396449 A1 Dec. 7, 2023

Related U.S. Application Data

(60) Provisional application No. 63/365,673, filed on Jun. 1, 2022.

(51) Int. Cl.
*H04L 29/06* (2006.01)
*H04L 9/08* (2006.01)
*H04L 9/32* (2006.01)

(52) U.S. Cl.
CPC .......... *H04L 9/3265* (2013.01); *H04L 9/0825* (2013.01)

(58) Field of Classification Search
CPC ... H04L 9/3265; H04L 9/0825; H04L 9/0891; H04L 9/0897; H04L 9/3247; H04L 63/0823; H04L 63/126; H04L 9/40
See application file for complete search history.

(56) References Cited

U.S. PATENT DOCUMENTS

| 9,215,223 | B2* | 12/2015 | Kirsch | G06F 21/31 |
| 9,460,173 | B2* | 10/2016 | Abrams | G06F 16/256 |
| 10,771,264 | B2* | 9/2020 | Edwards | G06F 21/572 |

(Continued)

FOREIGN PATENT DOCUMENTS

| CN | 107809411 A | * | 3/2018 | ........ H04W 12/0433 |
| CN | 109492352 A | * | 3/2019 | ........... G06F 21/125 |

(Continued)

OTHER PUBLICATIONS

TCG, DICE Layering Architecture, Jul. 23, 2020, Version 1.0, Revision 0.19, pp. 30.*

*Primary Examiner* — Sher A Khan
(74) *Attorney, Agent, or Firm* — Harrity & Harrity, LLP (57) ABSTRACT

Implementations described herein relate to a device identifier composition engine (DICE) 3-layer architecture. In some implementations, a device may include a secure computing environment including a hardware root of trust (HRoT) DICE component. The secure computing environment may include a DICE layer 0 component configured to derive a DICE identity key. The secure computing environment may include a DICE layer 1 component configured to derive a DICE alias key based on the DICE identity key. The secure computing environment may include a controller configured to receive an update to firmware of a component. The controller may be configured to update the firmware of the component based on receiving the update. The controller may be configured to update one or more keys of the component or one or more keys of one or more components above the component in a layer stack.

25 Claims, 6 Drawing Sheets

(56) References Cited

U.S. PATENT DOCUMENTS

| | | | |
|---|---|---|---|
| 11,128,474 B2* | 9/2021 | Troia | H04L 9/3297 |
| 2003/0154399 A1* | 8/2003 | Zuk | H04L 63/1416 |
| | | | 726/11 |
| 2015/0339664 A1* | 11/2015 | Wong | H04L 63/0823 |
| | | | 705/71 |
| 2016/0063060 A1* | 3/2016 | Nguyen | H04L 67/10 |
| | | | 707/770 |
| 2016/0248590 A1* | 8/2016 | Benson | H04W 12/128 |
| 2017/0302640 A1* | 10/2017 | Maletsky | H04L 67/125 |
| 2020/0119929 A1* | 4/2020 | Edwards | H04L 9/3265 |
| 2021/0067348 A1* | 3/2021 | Duval | H04L 9/321 |
| 2021/0226777 A1* | 7/2021 | Wilson | H04L 9/0861 |
| 2022/0038272 A1* | 2/2022 | Hershman | H04L 9/0866 |
| 2022/0222348 A1* | 7/2022 | Vaswani | H04L 9/0825 |
| 2022/0245252 A1* | 8/2022 | Smith | G06F 21/572 |
| 2022/0292203 A1* | 9/2022 | Severns-Williams | |
| | | | G06F 21/57 |
| 2023/0274002 A1* | 8/2023 | Orlando | G06F 21/575 |
| | | | 713/189 |
| 2023/0367575 A1* | 11/2023 | Izzo | H04L 9/088 |
| 2023/0370446 A1* | 11/2023 | Shiner | H04L 9/3265 |

FOREIGN PATENT DOCUMENTS

| | | | | | |
|---|---|---|---|---|---|
| CN | 111030822 A | * | 4/2020 | ............ | H04L 9/0643 |
| JP | 2019213085 A | * | 12/2019 | ............ | H04L 9/0894 |
| WO | WO-2022271554 A1 | * | 12/2022 | ............ | G06F 21/602 |

* cited by examiner

DEVICE IDENTIFIER COMPOSITION ENGINE 3-LAYER ARCHITECTURE

CROSS-REFERENCE TO RELATED APPLICATION

This patent application claims priority to U.S. Provisional Patent Application No. 63/365,673, filed on Jun. 1, 2022, entitled "DEVICE IDENTIFIER COMPOSITION ENGINE 3-LAYER ARCHITECTURE," which is hereby expressly incorporated by reference herein.

TECHNICAL FIELD

The present disclosure generally relates to devices with secure computing environments and, for example, a device identifier composition engine (DICE) 3-layer architecture for a device with a secure computing environment.

BACKGROUND

Device identifier composition engine (DICE) is a security standard created by the Trusted Computing Group (TCG). A DICE architecture is a functional architecture for providing security in devices, such as memory devices, internet of things (IoT) devices, system-on-chip (SoC) devices, or microcontroller devices, among other examples. In the DICE architecture, a DICE layer 0 may have firmware for a device and derive a set of keys based on a DICE hardware root of trust (HRoT) layer.

DETAILED DESCRIPTION

Validation of firmware authenticity is important for ensuring that firmware, which is to be executed by a device during, for example, a boot sequence, is valid and not subject to a malicious attack. For example, validation of firmware authenticity may be performed to ensure that firmware within a memory device is manufacturer-provided firmware, rather than firmware incorporated into the memory device by a malicious entity to enable exfiltration of data stored on the memory device. To validate firmware authenticity, a device identity of a device is signed as part of a Chain of Trust (CoT). The CoT is a set of linked certificates associated with the firmware and other components of the device. The CoT may link back to a Root of Trust (RoT), such as a root Certificate Authority (CA). Each certificate of the CoT is signed by a predecessor certificate (e.g., a parent certificate) in the CoT, linking back to the RoT (e.g., the root CA). In this way, each successive component in the CoT can verify that it is valid based on a validity of a parent component in the CoT. In other words, from a root certificate, a chain of certificates exists to each leaf certificate (e.g., an ending certificate with no children certificates in the chain), thereby enabling tracking of validity of a set of linked components having leaf certificates.

In a device identifier composition engine (DICE) architecture, a DICE device identity, which may be termed a "DeviceID", is bound to a single DICE layer ("DICE layer 0"). DICE layer 0 is a mutable software layer within a secure computing environment, such as a Secure Execution Environment (SEE). The DICE architecture uses a CoT to bind a DeviceID public key to a root CA, thereby enabling verification of a validity of DICE layer 0, the DeviceID public key thereof, and subsequent components in the CoT with certificates hierarchically signed and linked to the DeviceID public key. Periodically, it may be desirable to update firmware of the DICE layer 0, such as to fix bugs, fix security holes, or provide different functionality than was originally designed for the firmware, among other examples. When the firmware of DICE layer 0 is updated, the DeviceID is changed to an unsigned DeviceID, which breaks an existing CoT. In other words, both a DICE identity key and any associated DICE alias keys must be updated when firmware is changed at DICE layer 0. Accordingly, a new DeviceID certificate is issued by the root CA to restore the CoT and enable issuance of a new DICE identity key and a new DICE alias key, as well as associated certificates. However, issuing a new DeviceID certificate may waste resources and/or cause security issues. Further, issuing a new DeviceID certificate may increase a deployment complexity for devices with a DICE architecture and a manner for issuing the new DeviceID certificate may not be established, which may result in ad hoc issuance causing security issues.

Some implementations described herein use a DICE 3-layer architecture to enable updating of firmware without requiring issuance of a new DeviceID certificate. For example, the DICE 3-layer architecture may provide a thin DICE layer 0 with minimal firmware to enable generation of the DeviceID and an associated DICE identity key. Furthermore, a new DICE layer 1 may include a remainder of the firmware for the device (e.g., DICE layer 1 may include firmware that was typically in the DICE layer 0 in a DICE 2-layer architecture). In this case, most firmware updates can occur at DICE layer 1, rather than DICE layer 0.

When a firmware update occurs at DICE layer 1, the DeviceID and associated DICE identity key do not change (as the firmware update does not include firmware of DICE layer 0). Although the DICE alias key is updated to generate a new DICE alias key based on the update to the firmware of DICE layer 1, the new DICE alias key remains linked to the DeviceID and an associated DICE identity key. Accordingly, the CoT remains intact for the device, which avoids a need to issue a new DeviceID certificate and saves resources associated with communicating new certificates or generating new certificates, among other examples. Moreover, by reducing a need to issue new certificates, some implementations described herein improve information security. Furthermore, DICE layer 1 firmware can be updated with new features and/or security fixes without losing a DeviceID for a device that includes the DICE layer 1 firmware.

Figure 1:
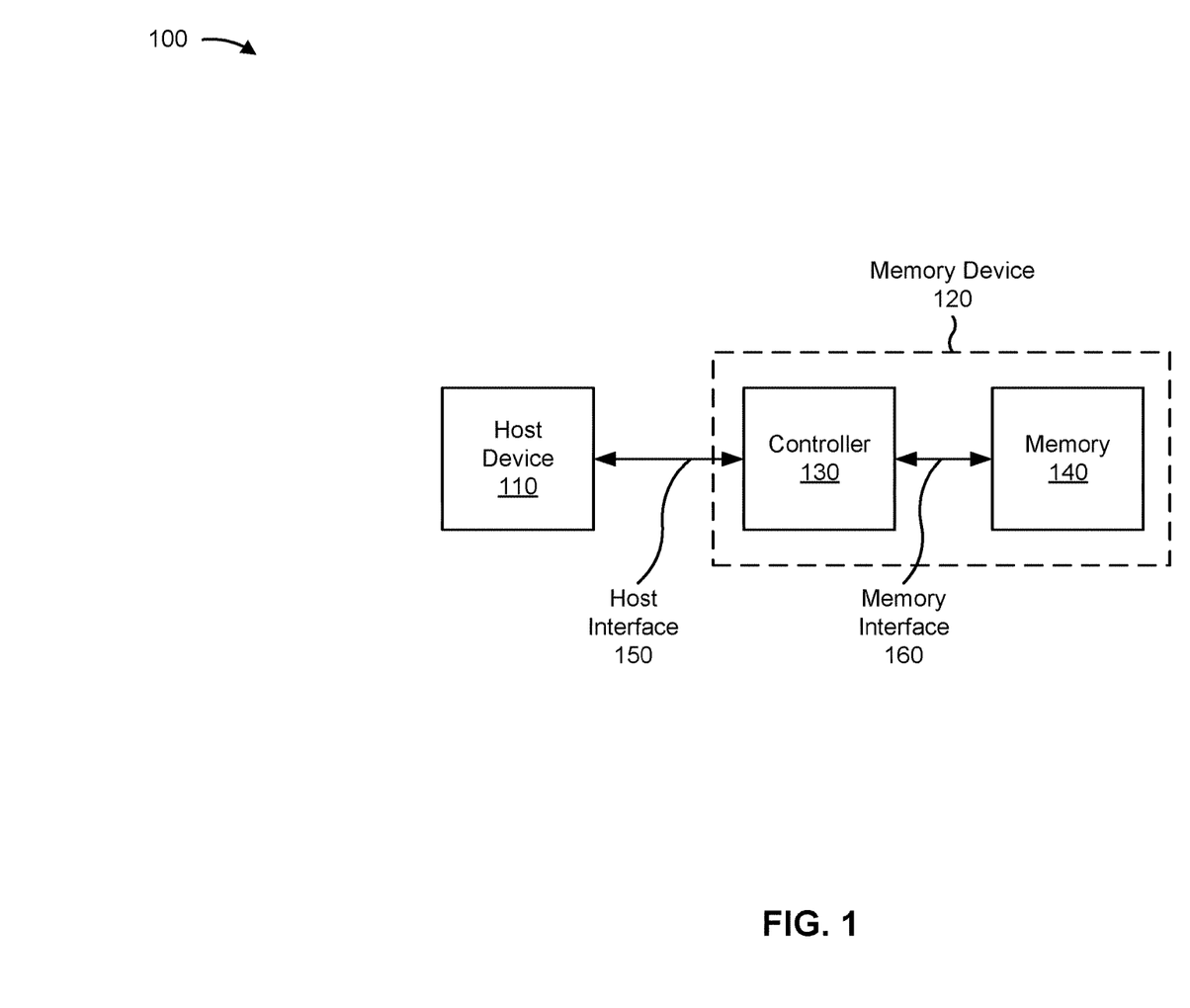
FIG. 1 is a diagram illustrating an example system capable of including a device with a device identifier composition engine (DICE) 3-layer architecture.

FIG. 1 is a diagram illustrating an example system 100 capable of including a device with a DICE 3-layer architecture. The system 100 may include one or more devices, apparatuses, and/or components for performing operations described herein (e.g., for providing a secure computing environment). For example, the system 100 may include a host device 110 and a memory device 120. The memory device 120 may include a controller 130 and memory 140. The host device 110 may communicate with the memory device 120 (e.g., the controller 130 of the memory device 120) via a host interface 150. The controller 130 and the memory 140 may communicate via a memory interface 160.

The system 100 may be any electronic device configured to store data in memory. For example, the system 100 may be a computer, a mobile phone, a wired or wireless communication device, a network device, a server, a vehicle (e.g., an automobile or an airplane), and/or an Internet of Things (IoT) device. The host device 110 may include one or more processors configured to execute instructions and store data in the memory 140. For example, the host device 110 may include a central processing unit (CPU), a graphics processing unit (GPU), a field-programmable gate array (FPGA), an application-specific integrated circuit (ASIC), and/or another type of processing component. In some implementations, the host device 110 may be or may be included in platforms that utilize embedded devices, such as internet of things (IoT) platforms, cloud computing platforms, or manufacturing platforms, among other examples.

The memory device 120 may be any electronic device configured to store data in memory. In some implementations, the memory device 120 may be an electronic device configured to store data persistently in non-volatile memory. For example, the memory device 120 may be a hard drive, a Solid-State Drive (SSD), a flash memory device (e.g., a NAND flash memory device or a NOR flash memory device), a Universal Serial Bus (USB) thumb drive, a memory card (e.g., a secure digital (SD) card), a secondary storage device, a Non-Volatile Memory express (NVMe) device, and/or an embedded multimedia card (eMNIC) device. In this case, the memory 140 may include non-volatile memory configured to maintain stored data after the memory device 120 is powered off. For example, the memory 140 may include NAND memory or NOR memory. In some implementations, the memory 140 may include volatile memory that requires power to maintain stored data and that loses stored data after the memory device 120 is powered off, such as one or more latches and/or random-access memory (RAM), such as dynamic RAM (DRAM) and/or static RAM (SRAM). For example, the volatile memory may cache data read from or to be written to non-volatile memory, and/or may cache instructions to be executed by the controller 130.

The controller 130 may be any device configured to communicate with the host device (e.g., via the host interface 150) and the memory 140 (e.g., via the memory interface 160). Additionally, or alternatively, the controller 130 may be configured to control operations of the memory device 120 and/or the memory 140. For example, the controller 130 may include a memory controller, a system controller, an ASIC, an FPGA, a processor, a microcontroller, and/or one or more processing components.

The host interface 150 enables communication between the host device 110 and the memory device 120. The host interface 150 may include, for example, a Small Computer System Interface (SCSI), a Serial-Attached SCSI (SAS), a Serial Advanced Technology Attachment (SATA) interface, a Peripheral Component Interconnect Express (PCIe) interface, an NVMe interface, a USB interface, a Universal Flash Storage (UFS) interface, and/or an embedded multimedia card (eMMC) interface.

The memory interface 160 enables communication between the memory device 120 and the memory 140. The memory interface 160 may include a non-volatile memory interface (e.g., for communicating with non-volatile memory), such as a NAND interface or a NOR interface. Additionally, or alternatively, the memory interface 160 may include a volatile memory interface (e.g., for communicating with volatile memory), such as a double data rate (DDR) interface.

In some implementations, memory device 120 may have a DICE 3-layer architecture. For example, memory device 120 may be an embedded device that uses a DICE 3-layer architecture for creating an identify value derived from a unique device secret (UDS). In this case, the controller 130 may execute commands to generate a Compound Device Identifier (CDI), as described herein and/or generate a certificate or key pair associated therewith. Other types of embedded systems that can include a DICE 3-layer architecture are contemplated.

As indicated above, FIG. 1 is provided as an example. Other examples may differ from what is described with regard to FIG. 1.

Figure 2:
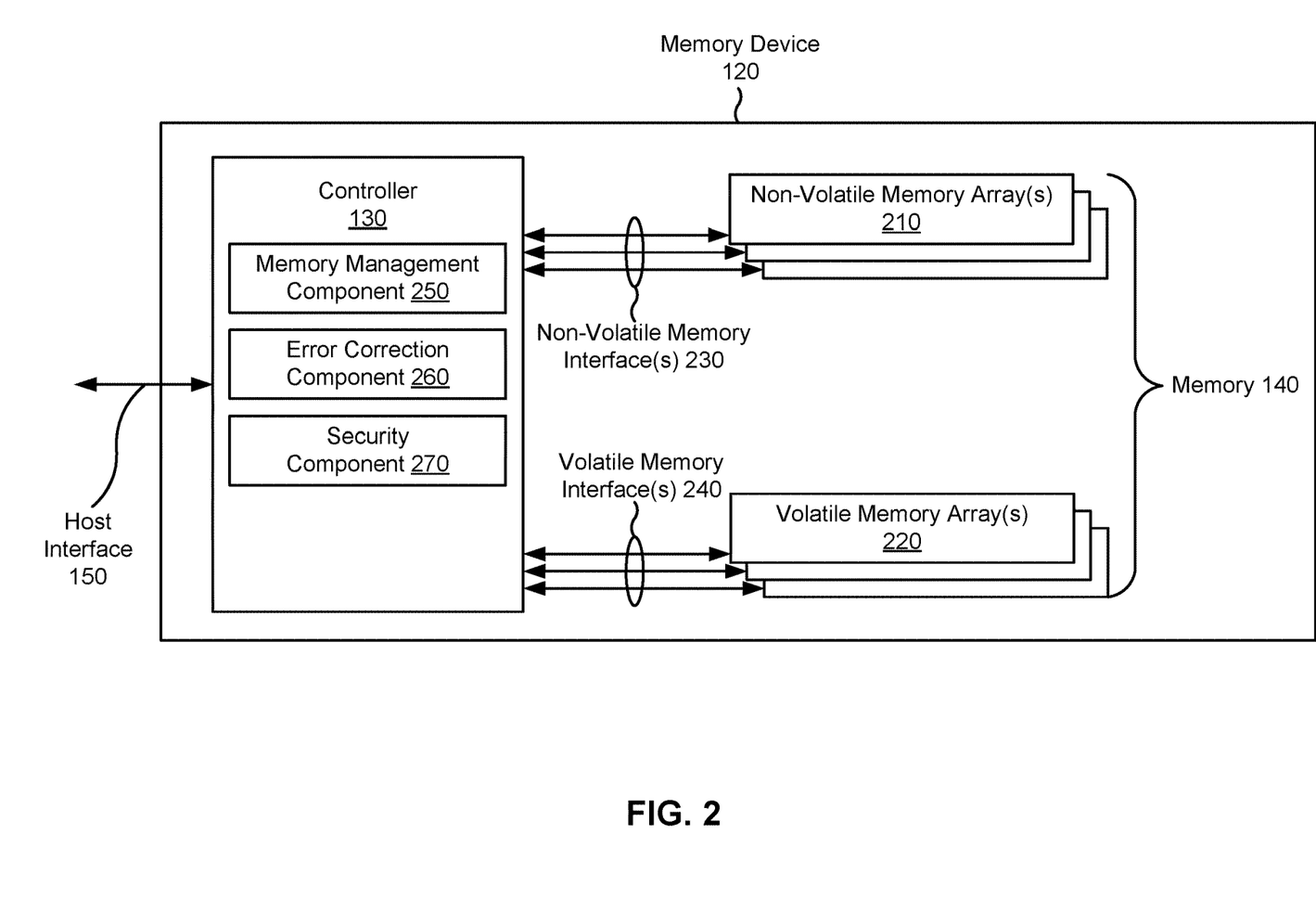
FIG. 2 is a diagram illustrating example components included in a device with a DICE 3-layer architecture

FIG. 2 is a diagram of example components included in the memory device 120 of FIG. 1. As described above in connection with FIG. 1, the memory device 120 may include a controller 130 and memory 140. As shown in FIG. 2, the memory 140 may include one or more non-volatile memory arrays 210, such as one or more NAND memory arrays and/or one or more NOR memory arrays. Additionally, or alternatively, the memory 140 may include one or more volatile memory arrays 220, such as one or more SRAM arrays and/or one or more DRAM arrays. The controller 130 may transmit signals to and receive signals from a non-volatile memory array 210 using a non-volatile memory interface 230. The controller 130 may transmit signals to and receive signals from a volatile memory array 220 using a volatile memory interface 240.

The controller 130 may control operations of the memory 140, such as by executing one or more instructions. For example, the memory device 120 may store one or more instructions in the memory 140 as firmware, and the controller 130 may execute those one or more instructions. In some implementations, portions of the firmware may be divided between different DICE layers of a DICE 3-layer architecture, as described herein. Additionally, or alternatively, the controller 130 may receive one or more instructions from the host device 110 via the host interface, and may execute those one or more instructions. In some implementations, a non-transitory computer-readable medium (e.g., volatile memory and/or non-volatile memory) may store a set of instructions (e.g., one or more instructions or code) for execution by the controller 130. The controller 130 may execute the set of instructions to perform one or more operations or methods described herein. In some implementations, execution of the set of instructions, by the controller 130, causes the controller 130 and/or the memory device 120 to perform one or more operations or methods described herein. In some implementations, hardwired circuitry is used instead of or in combination with the one or more instructions to perform one or more operations or methods described herein. Additionally, or alternatively, the controller 130 and/or one or more components of the memory device 120 may be configured to perform one or more operations or methods described herein. An instruction is sometimes called a "command."

For example, the controller 130 may transmit signals to and/or receive signals from the memory 140 based on the one or more instructions, such as to transfer data to (e.g., write or program), to transfer data from (e.g., read), and/or to erase all or a portion of the memory 140 (e.g., one or more memory cells, pages, sub-blocks, blocks, or planes of the memory 140). Additionally, or alternatively, the controller 130 may be configured to control access to the memory 140 and/or to provide a translation layer between the host device 110 and the memory 140 (e.g., for mapping logical addresses to physical addresses of a memory array). In some implementations, the controller 130 may translate a host interface command (e.g., a command received from the host device 110) into a memory interface command (e.g., a command for performing an operation on a memory array).

As shown in FIG. 2, the controller 130 may include a memory management component 250, an error correction component 260, and/or a security component 270. In some implementations, one or more of these components are implemented as one or more instructions (e.g., firmware) executed by the controller 130. Alternatively, one or more of these components may be implemented as dedicated integrated circuits distinct from the controller 130.

The memory management component 250 may be configured to manage performance of the memory device 120. For example, the memory management component 250 may perform wear leveling, bad block management, block retirement, read disturb management, and/or other memory management operations. In some implementations, the memory device 120 may store (e.g., in memory 140) one or more memory management tables. A memory management table may store information that may be used by or updated by the memory management component 250, such as information regarding memory block age, memory block erase count, and/or error information associated with a memory partition (e.g., a memory cell, a row of memory, a block of memory, or the like).

The error correction component 260 may be configured to detect and/or correct errors associated with the memory device 120. For example, the error correction component 260 may be configured to detect and/or correct an error associated with writing data to or reading data from one or more memory cells of a memory array, such as a single-bit error (SBE) or a multi-bit error (MBE).

The security component 270 may be configured to perform one or more security operations for the memory device 120. For example, the security component 270 may be configured to encrypt or decrypt data, such as data read from the memory 140 and/or data to be written to the memory 140. Additionally, or alternatively, the security component 270 may be configured to validate commands received from the host device 110, such as by validating a cryptographic signature of a command (e.g., using one or more cryptographic keys). In some implementations, the security component 270 may be a part of or implement a secure execution environment and/or a secure data storage environment for generating and/or storing information associated with a chain of trust (CoT) of a DICE 3-layer architecture, as described herein.

Figure 3:
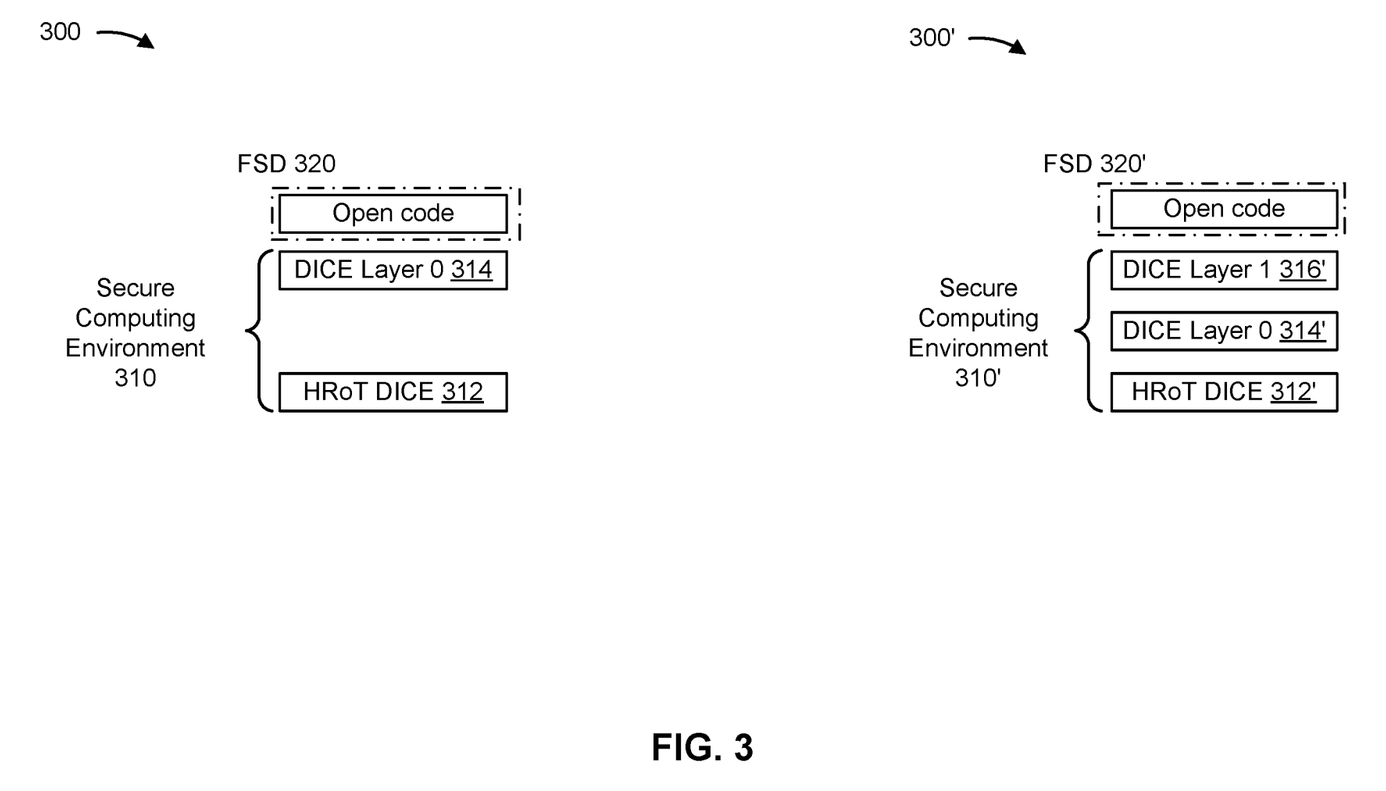
FIG. 3 is a diagram illustrating examples of DICE architectures.
Figure 4:
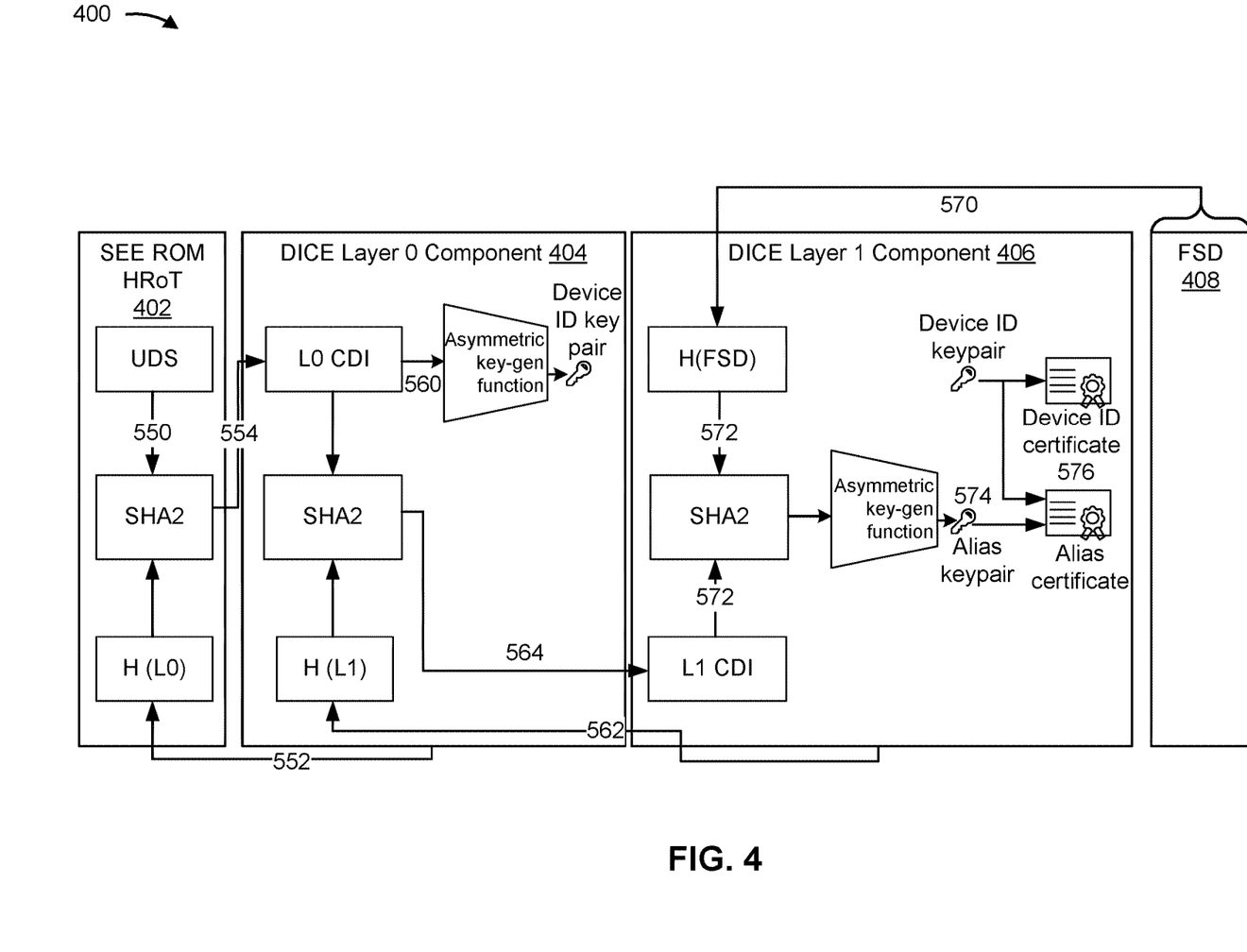
FIG. 4 is a diagram illustrating an example of components of a device with a DICE 3-layer architecture.
Figure 5:
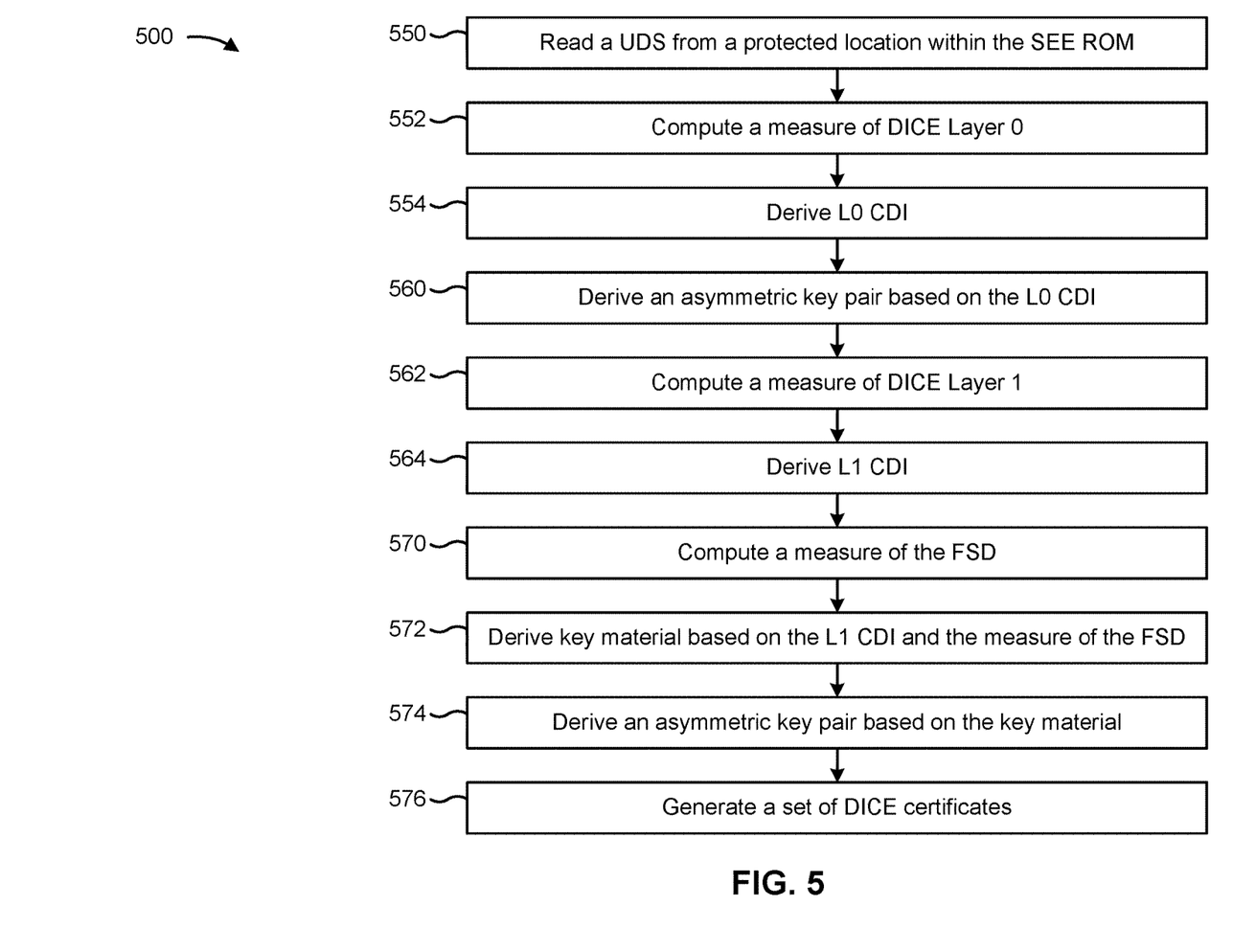
FIG. 5 is a flowchart of an example of provisioning a device with a DICE 3-layer architecture.
Figure 6:
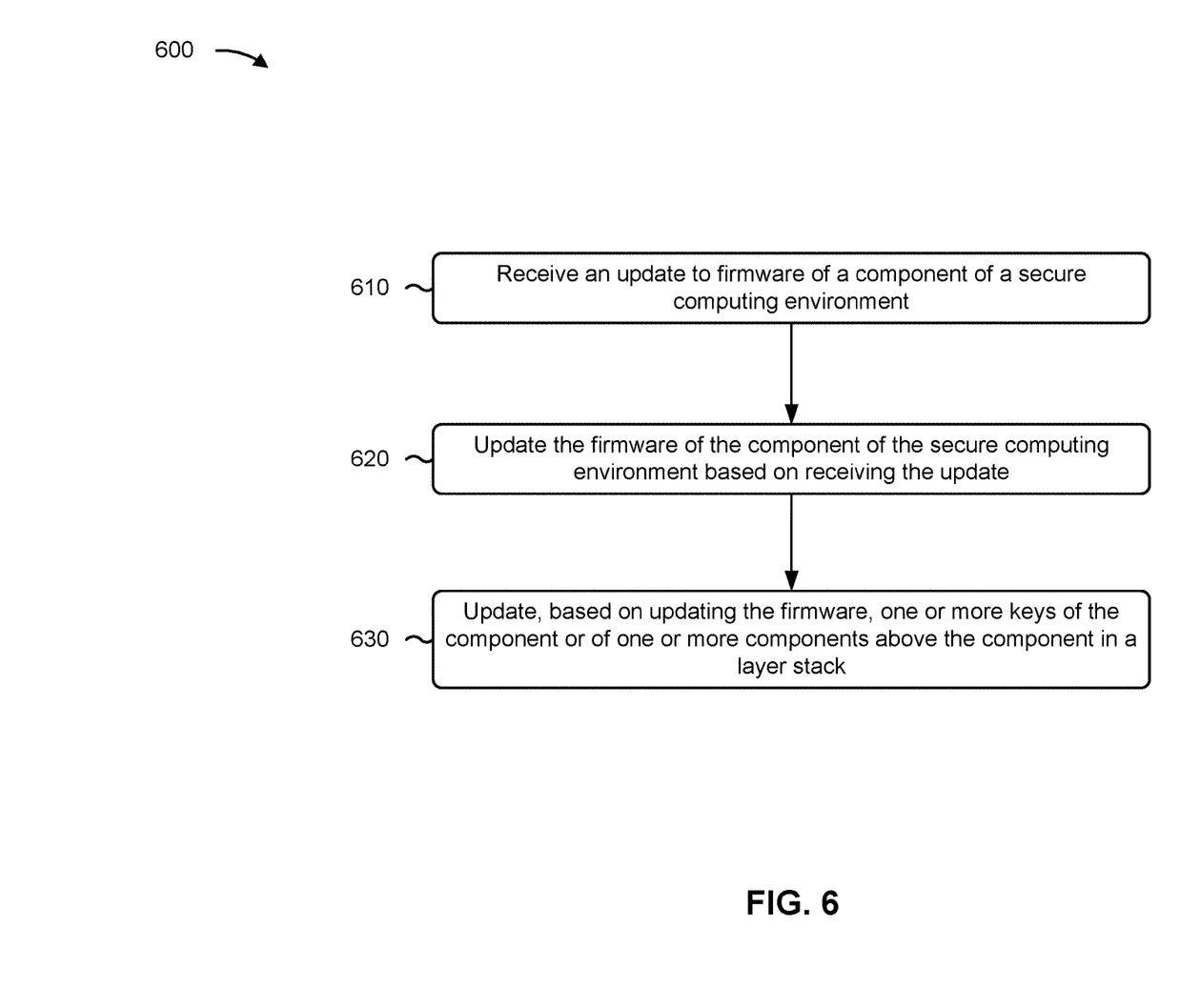
FIG. 6 is a flowchart of an example of updating firmware of a device with a DICE 3-layer architecture.

One or more devices or components shown in FIG. 2 may be used to carry out operations described elsewhere herein, such as one or more operations of FIGS. 3 and 4 and/or one or more process blocks of the methods of FIGS. 5 and 6. For example, the controller 130 and/or the security component 270 may perform one or more operations and/or methods for the memory device 120. Although some implementations are described herein in terms of a memory device 120, other types of devices that integrate a DICE 3-layer architecture are contemplated.

The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) shown in FIG. 2 may perform one or more operations described as being performed by another set of components shown in FIG. 2.

FIG. 3 is a diagram illustrating examples of DICE architectures. As shown in FIG. 3, a first DICE architecture 300 is a DICE 2-layer architecture and a second DICE architecture 300' is a DICE 3-layer architecture.

As further shown in FIG. 3, the DICE architectures 300/300' include a secure computing environment 310/310' and a firmware security descriptor (FSD) component 320/320'. The FSD component 320/320' may include open code, such as firmware or software that is not included in the secure computing environment 310/310' and may describe security characteristics of the DICE architecture 300/300' not included in the secure computing environment 310/310'. In the first DICE architecture 300, the secure computing environment 310 includes an HRoT DICE component 312 and a DICE layer 0 component 314. In the second DICE architecture 300', the secure computing environment 310' includes an HRoT DICE component 312', a DICE layer 0 component 314' that is above the HRoT DICE component 312' (e.g., in a protocol stack or architecture stack), and a DICE layer 1 component 316' that is above the DICE layer 1 component 314' (e.g., in the protocol stack or the architecture stack). Although some implementations are described herein in terms of a DICE 3-layer architecture, other higher layer architectures (e.g., where functionalities described herein in terms of DICE layer 1 are divided into multiple layers) are contemplated.

The HRoT DICE component 312' is a component associated with providing a unique device secret (UDS) for the second DICE architecture 300'. For example, the HRoT DICE component may generate a Compound Device Identifier (CDI) based on the UDS of the HRoT DICE component 312' and a measurement of the DICE layer 0 component 314'. In some implementations, the measurement of the DICE layer 0 component 314' may include a hash of, for example, code of the DICE layer 0 component 314'. For example, the HRoT DICE component 312' may hash a bit representation of the code of DICE layer 0 component 314' to generate a hash value. Additionally, or alternatively, the CDI may be based on a measurement of device configuration data. For example, the HRoT DICE component 312' may hash a bit representation of the code of DICE layer 0 component 314' and a bit representation of device configuration data associated with DICE layer 0 component 314' to generate the hash value.

The DICE layer 0 component 314' is a component associated with storing a DICE identity key for the second DICE architecture 300'. For example, the DICE layer 0 component 314' may inherit a layer 0 Compound Device Identifier (CDI) from the HRoT DICE component 312' and may generate a DICE identity key and a layer 1 CDI, as described herein. The layer 1 CDI may be used for generating DICE alias keys and associated certificates to verify an authenticity of other components above DICE layer 0 component 314' in a stack of the DICE 3-layer architecture 300'. The DICE identity key pair may be used to sign and validate an associated certificate. In some implementations, the DICE layer 0 component 314' may include mutable code, but may lack an entirety of firmware of DICE layer 0 component 314

(e.g., in the 2-layer DICE architecture 300). For example, the firmware of DICE layer 0 component 314 may be divided between DICE layer 0 component 314' and DICE layer 1 component 316', such that DICE layer 0 component 314' includes only sufficient firmware for, for example, generating the DICE identity key and providing the layer 1 CDI to DICE layer 1 component 316'. As one example, DICE layer 0 component 314' may include firmware for reading a layer 0 CDI from a SEE memory, computing a measurement of the DICE layer 1 component 316', deriving a DeviceID key pair from the layer 0 CDI, and deriving a layer 1 CDI for the DICE layer 1 component 316'. In this example, other functions, such as attestation protocol functions, updating procedures, certificate management, or antiglitch countermeasures, among other examples, are offloaded to the DICE layer 1 component 316'. For example, DICE layer 1 component 316' may include a remainder of the firmware for performing other functionalities of the secure computing environment 310/310'. As a result, DICE layer 0 component 314' will be associated with fewer firmware updates than DICE layer 0 component 314 (e.g., at least some firmware updates to DICE layer 0 component 314 in first DICE architecture 300 would apply to DICE layer 1 component 316' in second DICE architecture 300').

The DICE layer 1 component 316' is a component associated with storing a DICE alias key for the second DICE architecture 300'. For example, the DICE layer 1 component 316' may generate and store a DICE alias key based on and connected in a CoT with the DICE identity key. The DICE alias key and associated certificates can be used to verify an authenticity of a system including the DICE 3-layer architecture 300' and firmware thereof. Moreover, the DICE alias key can be used to verify subsequent components in a CoT as authentic. Additionally, or alternatively, the DICE layer 1 component 316' may generate a set of certificates based on the DICE identity key and/or the DICE alias key, as described herein. For example, the DICE layer 1 component 316' may include firmware configured to enable generation of a DeviceID certificate for the DICE identity key and/or an alias certificate for the alias key. The alias certificate may be a leaf certificate associated with an alias manifest that is signed with the DeviceID private key. The DeviceID certificate is an intermediate certificate with a DeviceID public key in the DeviceID certificate and with the DeviceID, itself, being signed using a manufacturer private key. The manufacturer private key may be associated with a root certificate that is external to the memory device 120, includes the manufacturer public key, and is signed by the manufacturer. Between the DeviceID certificate and the manufacturer certificate may be one or more other intermediate certificates. In some implementations, the DICE layer 1 component 316' may output one or more generated certificates to enable validation of a component associated with the one or more generated certificates (e.g., the DICE layer 1 component 316' and/or the DICE layer 0 component 314').

As indicated above, FIG. 3 is provided as an example. Other examples may differ from what is described with regard to FIG. 3.

FIG. 4 is a diagram illustrating an example of components of a device 400 with a DICE 3-layer architecture. FIG. 5 is an example method 500 associated with provisioning the device 400 (e.g., which may correspond to memory 140, controller 130, memory device 120, or security component 270, among other examples) with the DICE 3-layer architecture (e.g., the DICE 3-layer architecture 300').

As shown in FIG. 4, the device 400 may include a SEE ROM HRoT 402, which may correspond to HRoT DICE component 312', a DICE layer 0 component 404, which may correspond to DICE layer 0 component 314', a DICE layer 1 component 406, which may correspond to DICE layer 1 component 316', and an FSD 408, which may correspond to FSD component 320'.

As shown in FIGS. 4 and 5, and by reference number 550, the device 400 may read a UDS from a protected location within the SEE ROM. The UDS may be a statistically Unique Device-specific Secret value specific to hardware of the device 400. In some implementations, the UDS may be generated externally and installed with the device 400 during manufacture. Additionally, or alternatively, the UDS may be generated internally during device provisioning, such as by using a physically unclonable function (PUF). For example, the device 400 may obtain the UDS from a secure element of a memory structure associated with SEE ROM HRoT 402. In some implementations, the device 400 may receive, at the SEE ROM HRoT 402, a command to generate a set of certificates. For example, the device 400 may receive the command (e.g., the memory device 120 may receive the command from the host device 110) to generate the set of certificates in connection with a boot procedure or a validation procedure, among other examples. In this case, the device 400 (e.g., using the SEE ROM HRoT 402) may obtain the UDS to enable generation of the set of certificates. In some implementations, the device 400 may receive a command to generate a certificates. In some implementations, the command may include or be associated with a set of sub-commands (e.g., a first command for the SEE ROM HRoT 402, a second command for the DICE layer 0 component, or a third command for the DICE layer 1 component, among other examples). In this case, the device 400 may receive multiple commands or may autonomously break a single command into a set of multiple commands for multiple components of the device 400.

As shown by reference number 552, the device 400 may compute a measure of DICE layer 0 component 404. For example, the device 400 may compute a hash of the code of DICE layer 0 component 404 (e.g., the firmware stored in or associated with DICE layer 0 component 404, or a portion of that firmware), using a hash function H(L0). As shown by reference number 554, the device 400 may derive a layer 0 (L0) CDI based on the UDS and the measure of DICE layer 0 component 404. For example, the device 400 may implement an encryption algorithm, such as secure hash algorithm 2 (SHA2), to process the UDS and H(L0) to generate a value for the L0 CDI (e.g., the device 400 may apply SHA2 or another hashing algorithm, to the UDS and the measure of DICE layer 0 component 404, to generate the L0 CDI). In some implementations, the device 400 may generate the L0 CDI at DICE layer 0 component 404. In some implementations, the L0 CDI may be a representation of mutable code of DICE layer 0 component 404. For example, the L0 CDI is generated based on the code of DICE layer 0 component 404. Accordingly, different code of DICE layer 0 component 404 may result in a different L0 CDI being generated. In some implementations, a CDI may represent an immutable code measurement of mutable code. The measurement is combined with the device-specific UDS, as described above, to form the CDI. Accordingly, the CDI is unique to the device 400, the cryptographic identity of the mutable code of the device 400 (e.g., mutable code of DICE layer 0 component 404), and/or configuration data of the device 400.

As shown by reference number 560, the device 400 may derive an asymmetric key pair based on the L0 CDI. For example, the device 400 may use an asymmetric key generation function to generate a device identity key, such as the DeviceID for the device 400, based on the L0 CDI. In some implementations, the device identity key may be a root node for a DICE derivation chain (e.g., the CoT). In this way, the DeviceID is linked, in connection with a CoT, to the UDS in a secure manner (e.g., via hashing the UDS and a measure). As shown by reference number 562, the device 400 may compute a measure of DICE layer 1 component 406. For example, the device 400 may compute a hash of the code of DICE layer 1 component 406 (e.g., the firmware stored in or associated with DICE layer 1 component 406, or a portion of that firmware), using a hash function H(LD. As shown by reference number 564, the device 400 may derive a layer 1 (L1) CDI based on the L0 CDI and the measure of DICE layer component 404. For example, the device 400 may implement an encryption algorithm, such as SHA2, to process the L0 CDI and H(L1) to generate a value for the L1 CDI (e.g., the device 400 may apply SHA2 or another hashing algorithm, to the L0 CDI and the measure of DICE layer 1 component 406, to generate the L1 CDI). In some implementations, the device 400 may derive the L1 CDI at DICE layer 1 component 406. In some implementations, the L1 CDI may be a representation of firmware of the DICE layer 1 component 406. For example, the L1 CDI is generated based on the firmware of DICE layer 1 component 406. Accordingly, different firmware of DICE layer 1 component 406 may result in a different L0 CDI being generated.

As shown by reference number 570, the device 400 may compute a measure of FSD 408, which may be an open firmware component as described above in connection with FIG. 3. For example, the device 400 may hash a set of open images of FSD 408 406 (e.g., code, data, or configuration information stored in or associated with FSD 408, or a portion of that code, data, or configuration information) to determine a measure of FSD 408. In some implementations, the device 400 may implement hash function H(FSD) to process FSD 408 (e.g., to hash open code or firmware of FSD 408). As shown by reference number 572, the device 400 may derive key material based on the L1 CDI and the measure of FSD 408. For example, the device 400 may implement a one-way-function, such as SHA2, to process the L1 CDI and H(FSD) (e.g., the device 400 may apply SHA2 or another hashing algorithm, to the L1 CDI and the measure of FSD 408, to generate the key material). The key material may be used to generate an alias key, as described below. In some implementations, the device 400 may derive the key material at DICE layer 1 component 406. In some implementations, the key material may be a representation of code of the FSD 408. The key material may be based on the FSD 408 and the layer 1 CDI. FSD 408 input may bind open images measurement to the key material. Accordingly, if FSD 408 changes the key material, an associated asymmetric key pair, as described herein, is changed. The layer 1 CDI binds the key material indirectly to the UDS and the layer 0 CDI, such that if the UDS or the layer 0 CDI changes, the key material changes and an associated asymmetric key pair is changed. Accordingly, a host device 110 may authenticate the memory device 120 by receiving a certificate signed with different keys and detecting whether the device code has changed (e.g., based on whether the different keys have changed).

As shown in FIGS. 4 and 5, and by reference number 574, the device 400 may derive an asymmetric key pair based on the key material. For example, the device 400 may use an asymmetric key generation function to generate an alias key based on the key material. In this way, the alias key is linked, in connection with a CoT, to the UDS (e.g., via the L1 CDI and the L0 CDI). As shown by reference number 576, the device 400 may generate a set of DICE certificates. For example, the device 400 may use the DeviceID key pair to generate a DeviceID certificate (e.g., a device identifier certificate). Additionally, or alternatively, the device 400 may use the DeviceID key pair and the alias key pair to generate a signed alias certificate. In some implementations, the DeviceID certificate may be a signed device identity for the Device ID key pair. In this way, the device 400 may generate a set of certificates as a response to a command to generate a set of certificates.

In some implementations, the device 400 may receive another command to provide at least one of the set of certificates (e.g., the DeviceID certificate and/or the alias certificate) and may provide the at least one of the set of certificates based on receiving the command, thereby enabling validation of a component associated with the at least one certificate. For example, when a system that includes the device 400 is to verify that the device 400 booted firmware provided by a manufacturer of the device 400, the device 400 may receive a command to provide attestation. In this case, the device 400 may use the DeviceID certificate and/or the alias certificate to provide attestation to the system. In some implementations, the device 400 may provide the alias certificate to verify the device 400 to the system, and may use the DeviceID certificate to verify the alias certificate. In some implementations, the device 400 may use the alias key to determine a Message Authentication Code (MAC) as a response to a challenge (e.g., for verification or attestation).

In some implementations, the device 400 may receive an update to code of the device 400, such as software of the device 400 or firmware of the device 400. For example, the device 400 may receive an update to code of the FSD 408, the DICE layer 1 component 406, or the DICE layer 0 component 404. When the device 400 receives an update to code of the DICE layer 0 component 404, the device 400 generates a new L0 CDI (which is based on a hash of the code of the DICE layer 0 component 404) and a new Device ID (which is based on the L0 CDI). In this case, the alias keys and corresponding certificates are regenerated. In contrast, when the code of DICE layer 1 component 406 is modified, the L1 CDI (which is based on the L0 CDI and a hash of the code of DICE layer 1 component 406) is modified. Accordingly, when the L1 CDI is modified the alias key (which is based on the L1 CDI and a hash of open images of FSD 408) is modified. However, the DeviceID key, which is based on the L0 CDI, remains static during an update to the code of DICE layer 1 component 406. Similarly, an update to code of FSD 408 results in an update to the alias key, but not to the DeviceID key. Accordingly, by separating out firmware of a DICE layer into DICE layer 0 component 404 with the DeviceID key and DICE layer 1 component with the alias key, the device 400 is less likely to need to update the DeviceID key, which conserves resources and achieves a higher level of security, as described above. In this way, the memory device 120 can be updated, at DICE layer 1, with new features or security fixes without changing the DeviceID.

As indicated above, FIGS. 4 and 5 are provided as an example. Other examples may differ from what is described with regard to FIGS. 4 and 5.

FIG. 6 is a flowchart of an example method 600 associated with updating firmware of a device with a DICE 3-layer architecture. In some implementations, a device (e.g., device 400) may perform or may be configured to perform one or more process blocks of FIG. 6. In some implementations, one or more components of the device (e.g., a controller 130, an HRoT DICE component 312', a DICE layer 0 component 314', a DICE layer 1 component 316', an FSD component 320', a SEE ROM HRoT 402, a DICE layer 0 component 404, a DICE layer 1 component 406, or an FSD 408, among other examples) may perform or may be configured to perform one or more process blocks of FIG. 6.

As shown in FIG. 6, the method 600 may include receiving an update to firmware of a component of a secure computing environment (block 610). For example, the device may receive an update to a DICE layer 0 component or a DICE layer 1 component. As further shown in FIG. 6, the method 600 may include updating the firmware of the component of the secure computing environment based on receiving the update (block 620). As further shown in FIG. 6, the method 600 may include updating, based on updating the firmware, one or more keys of the component or of one or more keys of one or more components above the component in a layer stack (block 630). For example, when the update is to the DICE layer 0 component, the device may update one or more keys of the DICE layer 0 component and one or more keys of the DICE layer 1 component. For example, the device may generate an updated DICE DeviceID key and an updated DICE alias key. In contrast, when the update is to the DICE layer 1 component, the device may update one or more keys of the DICE layer 1 component, but the device may refrain from updating one or more keys of the DICE layer 0 component. For example, the device may generate an updated DICE alias key and may not need to generate an updated DICE DeviceID key.

Although FIG. 6 shows example blocks of a method 600, in some implementations, the method 600 may include additional blocks, fewer blocks, different blocks, or differently arranged blocks than those depicted in FIG. 6. Additionally, or alternatively, two or more of the blocks of the method 600 may be performed in parallel. The method 600 is an example of one method that may be performed by one or more devices described herein. These one or more devices may perform or may be configured to perform one or more other methods based on operations described herein, such as the operations described in connection with FIGS. 3-5.

In some implementations, a device includes a secure computing environment, comprising: a hardware root of trust (HRoT) device identifier composition engine (DICE) component, a DICE layer 0 component configured to derive a DICE identity key, wherein the DICE layer 0 component is above the HRoT DICE component in a layer stack; and a DICE layer 1 component configured to derive a DICE alias key based on the DICE identity key, wherein the DICE layer 1 component is above the DICE layer component in the layer stack; and a controller configured to: receive an update to firmware of a component of the secure computing environment; update the firmware of the component of the secure computing environment based on receiving the update; and update, based on updating the firmware, one or more keys of the component or one or more keys of one or more components above the component in the layer stack.

In some implementations, a method includes receiving, at an HRoT layer of a device, a command to generate a set of certificates; generating, at a DICE layer 0 of the device, a device identifier key based on a layer 0 CDI, wherein the layer 0 CDI is a representation of a mutable code of layer 0, wherein the device identifier key is a root node for a DICE derivation chain of the device; generating, at a DICE layer 1 of the device, an alias key based on a layer 1 CDI, wherein the layer 1 CDI is a representation of firmware of layer 1, wherein the alias key is a leaf node of the DICE derivation chain of the device; generating, at the DICE layer 1 of the device, the set of certificates as a response to the command and based on the device identifier key and the alias key; and storing the set of set of certificates in a memory of the device to enable the device to provide the set of certificates as a response to another command.

In some implementations, a system includes memory; and a controller configured to: generate a layer 0 CDI for a DICE layer 0 component using a HRoT component, generate a DICE identity key using the DICE layer 0 component and based on the layer 0 CDI; generate an alias key using a DICE layer 1 component and based on the DICE identity key; receive an update to firmware of the DICE layer 1 component; update the firmware of the DICE layer 1 component without updating firmware of the DICE layer 0 component; and regenerate the alias key without regenerating the DICE identity key based on updating the firmware of the DICE layer 1 component without updating the firmware of the DICE layer 0 component.

In some implementations, an apparatus includes means for identifying an update to firmware of a 3-layer DICE architecture device, wherein the 3-layer DICE architecture device includes a HRoT layer, a DICE layer 0 configured to store a DICE identity key, and a DICE layer 1 configured to store a DICE alias key, wherein an order of layers is such that the HRoT layer is a lowest layer of the 3-layer DICE architecture, the DICE layer 0 is a lower layer of the 3-layer DICE architecture, and the DICE layer 1 is an upper layer of the 3-layer DICE architecture; and means for updating the firmware of the 3-layer DICE architecture device, wherein the means for updating the firmware of the 3-layer DICE architecture comprises means for updating the firmware of a particular layer such that one or more keys of the particular layer or of a higher layer than the particular layer are updated and one or more keys of a lower layer than the particular layer are not updated.

The foregoing disclosure provides illustration and description but is not intended to be exhaustive or to limit the implementations to the precise forms disclosed. Modifications and variations may be made in light of the above disclosure or may be acquired from practice of the implementations described herein.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A device, comprising:
a secure computing environment, comprising:
a hardware root of trust (HRoT) device identifier composition engine (DICE) component,
a DICE layer 0 component configured to derive a DICE identity key, wherein the DICE layer 0 component is above the HRoT DICE component in a layer stack; and
a DICE layer 1 component configured to derive a DICE alias key based on the DICE identity key, wherein the DICE layer 1 component is above the DICE layer 0 component in the layer stack; and
a controller configured to:
receive an update to firmware of a component of the secure computing environment;
update the firmware of the component of the secure computing environment based on receiving the update; and
update, based on updating the firmware, one or more keys of the component or one or more keys of one or more components above the component in the layer stack.

2. The device of claim 1, wherein the controller is further configured to refrain from updating any keys of one or more components below the component in the layer stack based on updating the firmware.

3. The device of claim 1, wherein the component is the DICE layer 0 component; and
wherein the controller is configured to:
update the DICE identity key and the DICE alias key based on updating the firmware.

4. The device of claim 1, wherein the component is the DICE layer 1 component; and
wherein the controller is configured to:
update the DICE alias key but not the DICE identity key based on updating the firmware.

5. The device of claim 1, wherein the controller is configured to update the DICE alias key, to generate an updated DICE alias key, based on the update to the firmware, and
wherein the updated DICE alias key is linked to a signed device identity associated with the DICE identity key.

6. The device of claim 1, wherein the DICE alias key is linked to the DICE identity key, which is linked to a root certificate authority of the HRoT DICE component.

7. The device of claim 1, wherein the DICE identity key and the DICE alias key form at least a portion of a chain of trust of a set of components of the device.

8. The device of claim 1, wherein the DICE layer 1 component is configured to store a device identifier certificate and an alias certificate.

9. The device of claim 8, wherein the device identifier certificate is based on the DICE identity key.

10. The device of claim 8, wherein the alias certificate is based on the DICE identity key and the DICE alias key.

11. The device of claim 1, further comprising:
an open firmware component associated with a firmware security descriptor based on which a signed alias certificate is generated.

12. A system, comprising:
memory; and
a controller configured to:
generate a layer 0 compound device identifier (CDI) for a device identifier composition engine (DICE) layer 0 component using a hardware root of trust (HRoT) component,
generate a DICE identity key using the DICE layer 0 component and based on the layer 0 CDI;
generate an alias key using a DICE layer 1 component and based on the DICE identity key;
receive an update to firmware of the DICE layer 1 component;
update the firmware of the DICE layer 1 component without updating firmware of the DICE layer 0 component; and
regenerate the alias key without regenerating the DICE identity key based on updating the firmware of the DICE layer 1 component without updating the firmware of the DICE layer 0 component.

13. The system of claim 12, wherein the controller is configured to generate the alias key based on a layer 1 CDI.

14. The system of claim 13, wherein the controller is configured to generate the layer 1 CDI based on the layer 0 CDI and a derivation of the firmware of the DICE layer 1 component.

15. A method, comprising:
receiving an update to firmware of a secure computing environment, wherein the secure computing environment comprises:
a hardware root of trust (HRoT) device identifier composition engine (DICE) component,
a DICE layer 0 component configured to derive a DICE identity key, wherein the DICE layer 0 component is above the HRoT DICE component in a layer stack; and
a DICE layer 1 component configured to derive a DICE alias key based on the DICE identity key, wherein the DICE layer 1 component is above the DICE layer 0 component in the layer stack;
updating the firmware based on receiving the update; and
updating, based on updating the firmware:
one or more keys of a component associated with the firmware update, or
one or more keys of one or more components above the component in the layer stack.

16. The method of claim 15, further comprising:
refraining from updating any keys of one or more components below the component in the layer stack based on updating the firmware.

17. The method of claim 15, further comprising:
updating the DICE identity key and the DICE alias key based on updating the firmware.

18. The method of claim 15, further comprising:
updating the DICE alias key but not the DICE identity key based on updating the firmware.

19. The method of claim 15, wherein the DICE layer 0 is configured to store the DICE identity key and the DICE layer 1 is configured to store the DICE alias key.

20. The method of claim 15, wherein the secure computing environment comprises a 3-layer DICE architecture device.

21. The method of claim 15, wherein the DICE alias key is linked to the DICE identity key, which is linked to a root certificate authority of the HRoT DICE component.

22. The method of claim 15, wherein the DICE identity key and the DICE alias key form at least a portion of a chain of trust of a set of components of a device that comprises the secure computing environment.

23. A method, comprising:
receiving an update to firmware of a 3-layer device identifier composition engine (DICE) architecture device,
wherein the 3-layer DICE architecture device includes a hardware root of trust (HRoT) layer, a DICE layer 0 configured to store a DICE identity key, and a DICE layer 1 configured to store a DICE alias key, and
wherein an order of layers is such that the HRoT layer is a lowest layer of the 3-layer DICE architecture, the DICE layer 0 is a lower layer of the 3-layer DICE architecture, and the DICE layer 1 is an upper layer of the 3-layer DICE architecture; and
updating the firmware of the 3-layer DICE architecture device, wherein updating the firmware of the 3-layer DICE architecture comprises updating the firmware of a particular layer such that one or more keys of the particular layer or of a higher layer than the particular layer are updated and one or more keys of a lower layer than the particular layer are not updated.

24. The method of claim 23, further comprising:
updating the firmware of the DICE layer 1, wherein the update to the firmware of the DICE layer 1 triggers an update to the DICE alias key but not to the DICE identity key.

25. The method of claim 23, further comprising:
updating the firmware of the DICE layer 0, wherein the update to the firmware of the DICE layer 0 triggers an update to the DICE identity key and to the DICE alias key.

* * * * *